US012384171B2

(12) United States Patent
Theunissen et al.

(10) Patent No.: US 12,384,171 B2
(45) Date of Patent: Aug. 12, 2025

(54) METHOD FOR ENHANCING ADHESION OF A UV CURABLE INK

(71) Applicant: Canon Production Printing Holding B.V., Venlo (NL)

(72) Inventors: Fredericus P. H. Theunissen, Venlo (NL); Koen J. Klein Koerkamp, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 136 days.

(21) Appl. No.: 18/242,346

(22) Filed: Sep. 5, 2023

(65) Prior Publication Data

US 2024/0092095 A1 Mar. 21, 2024

(30) Foreign Application Priority Data

Sep. 19, 2022 (EP) .................................... 22196413

(51) Int. Cl.
*B41J 11/00* (2006.01)
*B41J 2/045* (2006.01)

(52) U.S. Cl.
CPC ..... *B41J 11/00212* (2021.01); *B41J 2/04503* (2013.01); *B41J 2/04551* (2013.01);
(Continued)

(58) Field of Classification Search
CPC ............ B41J 11/00214; B41J 11/00212; B41J 11/00218; B41J 11/0065; B41J 19/202;
(Continued)

(56) References Cited

U.S. PATENT DOCUMENTS 7,131,723 B2 * 11/2006 Hoshino ............ B41J 11/00214 347/17
7,261,408 B2 * 8/2007 Otter .................. B41J 11/00214 347/102

(Continued)

FOREIGN PATENT DOCUMENTS

EP 2 095 964 A1 9/2009
EP 2 095 966 A1 9/2009

OTHER PUBLICATIONS

European Search Report issued in Application No. 22 19 6413, dated Feb. 13, 2023.

*Primary Examiner* — John Zimmermann
(74) *Attorney, Agent, or Firm* — Birch, Stewart, Kolasch & Birch, LLP

(57) ABSTRACT

In a method of controlling a digital inkjet printer, the digital printer is arranged to operate in a selected first print mode which includes a first speed in a main scanning direction. A digital image and a print setting that the digital image is planned to be printed in an enhanced adhesion print mode are received. A time period needed for a pass in the main scanning direction is extended by lowering a speed from the first speed to a second speed, and by enlarging the pass width up to a maximum medium width and/or by temporarily stopping the printer at an end of the pass. Marking material is ejected during the pass on the image receiving medium by a print head at the second speed within the extended time period, and is cured by a UV curing device at the second speed within the extended time period.

17 Claims, 4 Drawing Sheets

(52) U.S. Cl.
CPC ..... *B41J 2/04586* (2013.01); *B41J 11/00214* (2021.01); *B41J 11/00218* (2021.01)

(58) Field of Classification Search
CPC ...... B41J 2/04503; B41J 11/002; B41J 29/38; B41M 7/0081; B41M 3/008
See application file for complete search history.

(56) References Cited

U.S. PATENT DOCUMENTS

| | | | | |
|---|---|---|---|---|
| 8,011,299 | B2 * | 9/2011 | Vosahlo | B41J 11/00216 101/424.1 |
| 2003/0043246 | A1 * | 3/2003 | Codos | B41J 2/01 347/102 |
| 2005/0018026 | A1 | 1/2005 | Nerad et al. | |
| 2005/0068396 | A1 * | 3/2005 | Ferran | B41J 11/00216 347/102 |
| 2006/0012630 | A1 | 1/2006 | Niekawa | |
| 2007/0058020 | A1 * | 3/2007 | Wetjens | C09D 11/34 347/102 |
| 2008/0174648 | A1 | 7/2008 | Nakano et al. | |
| 2010/0154244 | A1 * | 6/2010 | Kuta | B41J 11/00214 34/275 |
| 2014/0168307 | A1 * | 6/2014 | Silveston-Keith | B41J 29/38 347/16 |
| 2016/0347102 | A1 * | 12/2016 | Inayoshi | B41J 29/38 |
| 2022/0288953 | A1 | 9/2022 | Tokai | |
| 2023/0166526 | A1 * | 6/2023 | Arakane | B41J 2/2139 347/19 |

* cited by examiner

METHOD FOR ENHANCING ADHESION OF A UV CURABLE INK

The present invention relates to a method of controlling a digital inkjet printer for printing images on an image receiving medium up to a maximum medium width, the digital inkjet printer comprising a print head with an array of printing elements for ejecting marking material on the image receiving medium and a UV (ultra-violet) curing device, the print head and the UV curing device mounted on at least one carriage that is guided on guide rails, both the print head and the UV curing device being arranged to scan the image receiving medium in a main scanning direction, and the print head and the UV curing device being arranged to be moved relative to the image receiving medium in a sub-scanning direction normal to the main scanning direction in predetermined steps of relatively advancing the image receiving medium in the sub-scanning direction between passes of scanning the image receiving medium in the main scanning direction, the digital inkjet printer being arranged to operate in a selected first print mode which is characterized by a first speed in the main scanning direction for the at least one carriage, the method comprising the step of receiving a digital image to be printed by the digital inkjet printer.

Marking material is meant to be an ink, especially an UV curable ink.

Image receiving medium is meant to be paper, plastic, metal, wood, transparent material, glass, cardboard, label stock, coated paper, textile or any other printable medium.

The digital inkjet printer may hereinafter also be called an ink jet printing assembly. The UV curing device may hereinafter also be called curing means.

BACKGROUND OF THE INVENTION

Methods for applying an image onto a recording medium using a UV curable ink are known in the art. Generally, such methods comprise the step of applying the UV curable ink onto a recording medium, e.g. by jetting droplets of the ink using an ink jet printer. After the ink has been applied onto the receiving medium, the ink is hardened by irradiating the ink with a suitable source of radiation, preferably UV radiation. It is known in the art that, when the layer of UV curable ink applied onto the receiving medium is relatively thick, then it may not be possible to suitably cure the UV curable ink in one step. For example, the part of the ink layer close to the receiving medium may not completely cure. This problem may be addressed by curing the ink in a two-step procedure, as is explained for example in US 2008/0174648. Hence, it is known that applying UV radiation to a UV curable ink is required to suitably cure the ink.

However sometimes the adhesion of the ink to the recording medium is not enough for certain inks and for certain image receiving media. For example, adhesion may be difficult for certain inks in combination with PVC free media.

Therefore a need exists for a method that includes applying an image using an UV curable ink that mitigates the above mentioned problem.

It is therefore an object of the present invention to provide such a method.

It is another object of the present invention to provide an ink jet printer suitable for performing such a method.

SUMMARY OF THE INVENTION

The object is achieved in a method according to the invention, the method comprising the further steps of b) receiving a print setting that the digital image is planned to be printed in an enhanced adhesion print mode, c) extending a time period needed for a pass in the main scanning direction
  - c1) by lowering a speed in the main scanning direction from the first speed to a second speed, and
  - c2) by enlarging the pass width up to a maximum medium width in the main scanning direction and/or by temporarily stopping the at least one carriage at an end of the pass, d) ejecting the marking material during the pass on the image receiving medium by means of the print head at the second speed within the extended time period, and e) curing the marking material by means of the UV curing device at the second speed within the extended time period.

The adhesion improves since the marking material has a longer time to interact with the image receiving medium before the image receiving medium is cured ink. The adhesion also improves since the dose of UV radiation per unit area on the image receiving medium is increased due to the lower speed.

Compared to the standard print strategy with the first print speed, an option is offered to the customer to enhance the adhesion. When the option is selected, the print strategy is adapted: the carriage speed is lowered and the pass time is extended, for example to the maximum medium width, also for narrow images.

The ink may be cured in the pass after the pass in which it has been printed. Due to the lower carriage speed and the extended pass width the time between printing and curing is increased, resulting in a longer interaction time between ink and image receiving medium. Due to the lower carriage speed and equal lamp power of the UV curing device, a UV dose is increased.

The ink may be cured in the same pass directly after printing when the UV curing device is mounted on the same carriage as the print head. Due to the lower carriage speed width the time between printing and curing is slightly increased, resulting in a longer interaction time between ink and image receiving medium. Due to the lower carriage speed and equal lamp power of the UV curing device, a UV dose is also increased.

According to an embodiment the step of lowering the speed comprises the step of lowering the speed of the at least one carriage in the main scanning direction and simultaneously and accordingly lowering a frequency of ejecting the marking material on the image receiving medium. By doing so, exactly the same printed image is established on the image receiving medium. The print head is capable of jetting ink at different jet frequencies.

According to an embodiment the frequency of the second speed 15/50 or 35/50 of the frequency of the first speed. For example if the frequency of the first speed is 50 kHz, the frequency of the second speed is 15 or 35 kHz. Other ratios than 15/50 and 35/50 which are lower than 1 may be selected and will have the same effect. The lower the ratio is, the larger the effect will be.

According to an embodiment the step of temporarily stopping the at least one carriage is executed when reverting the direction of the at least one carriage in the main scanning direction at an end of the pass. By doing so, banding artefacts are avoided.

According to an embodiment the step of extending the time needed for the pass comprises the sub-step of further lowering a speed of the at least one carriage when reverting the direction of the at least one carriage in the main scanning direction at an end of the pass. In particular the at least one carriage is decelerated and accelerated when reverting the direction with a lower speed.

According to an embodiment the digital image as well as the print setting are received from an external raster image processor. The external raster image processor may also deliver the digital image in a rasterized shape.

According to an embodiment the digital inkjet printer comprises a user interface and the print setting is received by means of the user interface. The user interface may for example offer an enhanced adhesion print mode for each second speed possibility. If the frequency can be lowered to 35/50 or 15/50 of the frequency of the original speed, two enhanced adhesion print modes may be offered.

According to an embodiment the method comprises the step of automatically setting the enhanced adhesion print mode depending on a kind of image receiving medium the digital image is planned to be printed upon. For example, when the image receiving medium is a PVC free medium, the enhanced adhesion print mode may be automatically set by the print controller.

According to an embodiment the step of extending a time period needed for a pass in the main scanning direction comprises the sub-step of printing the pass according to a monodirectional print mode.

The present invention also relates to a digital inkjet printer for printing images on an image receiving medium up to a maximum medium width, the digital inkjet printer comprising a print controller, a print head with an array of printing elements for ejecting marking material on the image receiving medium and a UV curing device, the print head and the UV curing device mounted on at least one carriage that is guided on guide rails, both the print head and the UV curing device being arranged to scan the image receiving medium in a main scanning direction, and the print head and the UV curing device being arranged to be moved relative to the image receiving medium in a sub-scanning direction normal to the main scanning direction in predetermined steps of relatively advancing the image receiving medium in the sub-scanning direction between passes of scanning the image receiving medium in the main scanning direction, the digital inkjet printer being arranged to operate in a selected first print mode which is characterized by a first speed in the main scanning direction for the at least one carriage, wherein the print controller is configured to receiving a digital image to be printed by the digital inkjet printer, to receive a print setting that the digital image is planned to be printed in an enhanced adhesion print mode, to extend a time period needed for a pass in the main scanning direction c1) by lowering a speed in the main scanning direction from the first speed to a second speed, and c2) by enlarging the pass width up to a maximum medium width in the main scanning direction and/or by temporarily stopping the at least one carriage at an end of the pass, and the print head is configured to eject the marking material during the pass on the image receiving medium by means of the print head at the second speed within the extended time period, and the UV curing device is configured to cure the marking material by means of the UV curing device at the second speed within the extended time period.

According to an embodiment the digital image as well as the print setting are received by the print controller from an external raster image processor.

According to an alternative embodiment the digital inkjet printer comprises a user interface and the print setting is received by means of the user interface.

The present invention also relates to a software product comprising program code on a machine-readable medium, which program code, when loaded into a print controller of a digital inkjet printer, causes the print controller to control the digital inkjet printer in accordance with a method according to the invention.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
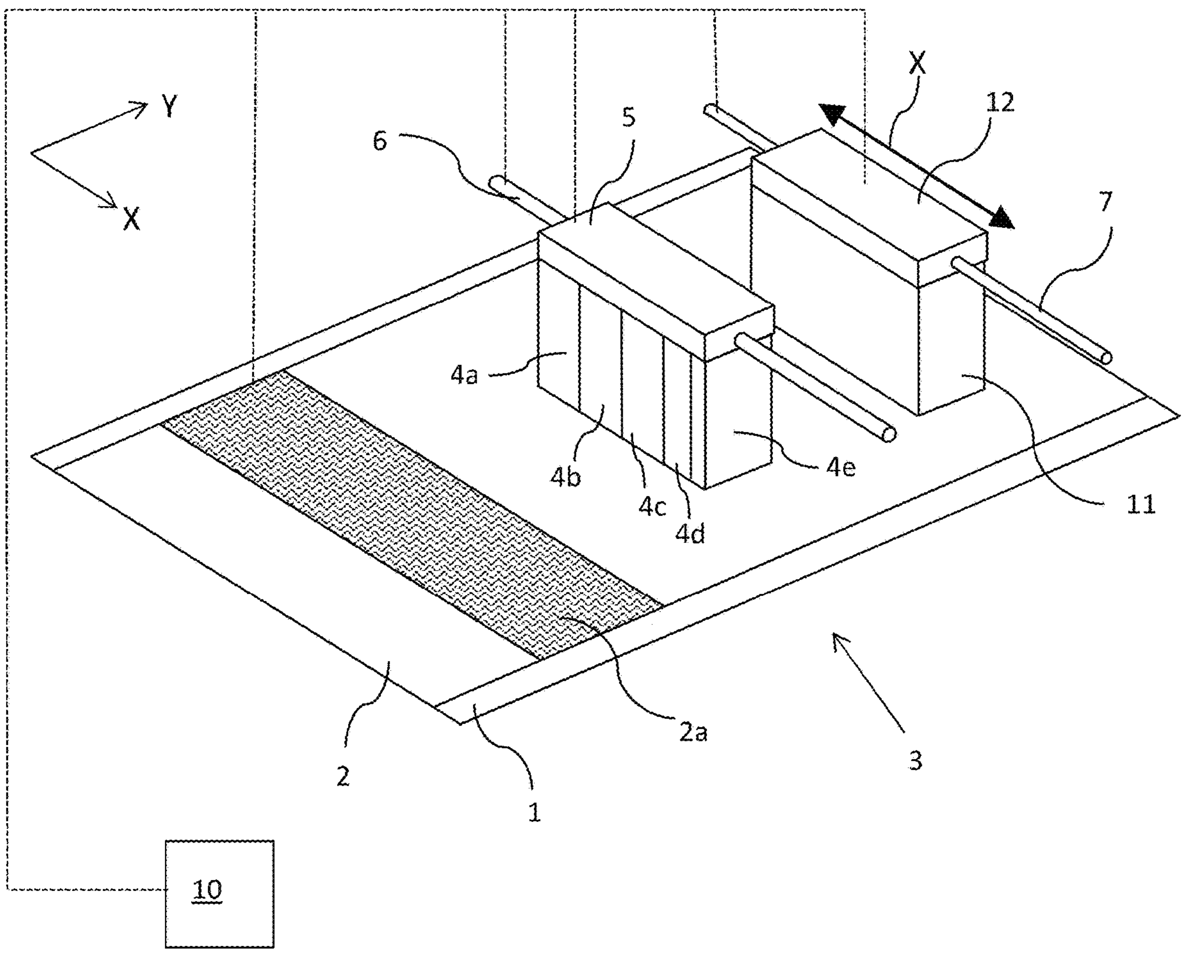
FIG. 1A shows a schematic representation of an inkjet printing system according to the present invention.
Figure 1B:
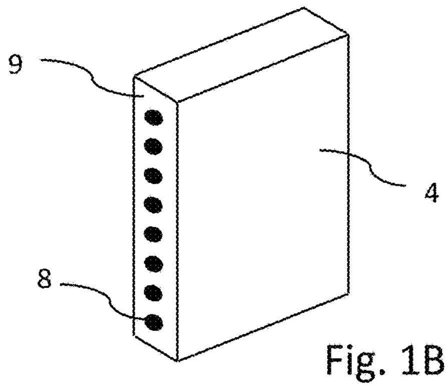
FIG. 1B shows a schematic representation of an inkjet print head according to the present invention.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4*a*-4*e*, mounted on a scanning print carriage 5. The scanning print carriage 5 is guided by suitable guiding means 6 to move in reciprocation in the main scanning direction X. Each print head 4*a*-4*e* comprises an orifice surface 9, which orifice surface 9 is provided with at least one orifice 8, as is shown in FIG. 1B. The print heads 4*a*-4*e* are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along five print heads 4*a*-4*e* provided with a fluid marking material.

The image receiving medium 2, as depicted in FIG. 1A is locally heated or cooled in the temperature control region 2*a*. In the temperature control region 2*a*, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2.

The temperature control means may further comprise a sensor (not shown) for monitoring the temperature of the image receiving medium 2.

A scanning print carriage 5 carries the five print heads 4*a*-4*e* and may be moved in reciprocation in the main scanning direction X parallel to the platen 1, such as to enable scanning of the image receiving medium 2 in the main scanning direction X. Only five print heads 4*a*-4*e* are depicted for demonstrating the invention. In practice an arbitrary number of print heads may be employed. For example, for a black-and-white printer, at least one print head 4*a*-4*e*, usually containing black marking material is present. Alternatively, a black-and-white printer may comprise a white marking material, which is to be applied on a black image-receiving medium 2. For a full-color printer, containing multiple colors, at least one print head 4*a*-4*e* for each of the colors, usually black, cyan, magenta, yellow and white is present.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4*a*-4*e* comprises an orifice surface 9 having at least one orifice 8, in fluid communication with a pressure chamber containing fluid marking material provided in the print head 4*a*-4*e*. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4*a*-4*e* are depicted in FIG. 1B, however obviously in a practical embodiment several hundreds of orifices 8 may be provided per print head 4*a*-4*e*, optionally arranged in multiple arrays.

As depicted in FIG. 1A, the respective print heads 4*a*-4*e* are placed parallel to each other. The print heads 4*a*-4*e* may be placed such that corresponding orifices 8 of the respective print heads 4*a*-4*e* are positioned in-line in the main scanning direction X. This means that a line of image dots in the main scanning direction X may be formed by selectively activating up to four orifices 8, each of them being part of a different print head 4*a*-4*e*. This parallel positioning of the print heads 4*a*-4*e* with corresponding in-line placement of the orifices 8 is advantageous to increase productivity and/or improve print quality. Alternatively multiple print heads 4*a*-4*e* may be placed on the print carriage adjacent to each other such that the orifices 8 of the respective print heads 4*a*-4*e* are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11. As shown in FIG. 1A, a scanning print carriage 12 carries the curing means 11 and may be moved in reciprocation in the main scanning direction X parallel to the platen 1, such as to enable scanning of the image receiving medium 2 in the main scanning direction X. Alternatively, more than one curing means may be applied. The curing means 11 may emit a beam of UV radiation with a certain intensity. The curing means 11 may be configured to provide the radiation for the curing step. Alternatively, the curing means may be mounted on the same carriage as the print heads.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the curing means 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the curing means 11 may be split into a first curing means and a second curing means which are positioned parallel to one another in the sub scanning direction Y. The first curing means and the second curing means may be the same type of energy source or may be different type of energy source. For example, when the first and second curing means respectively both emit actinic radiation, the wavelength of the radiated emitted by the two respective curing means may differ or may be the same. The first and second curing means may be distinct devices. However, alternatively, only one source of UV radiation emitting a spectrum of radiation may be used, together with at least two distinct filters. Each filter may absorb a part of the spectrum, thereby providing two beams of radiation, each one having an intensity different from the other.

The flat surface 1, the temperature control means, the carriage 5, the print heads 4*a*-4*e*, the carriage 12 and the curing means 11 are controlled by suitable print controller 10.

The curing means 11 may also be positioned on the same carriage 12 as the print heads 4*a*-4*e*. In an embodiment curing means are positioned before the print heads 4*a*-4*e* in the main direction X and are also positioned after the print heads 4*a*-4*e* in the main scanning direction X in order to enable bi-directional printing and curing. In this embodiment there is only one carriage 12. Since the curing takes place in another pass than the printing, also for this embodiment there is an extended time between printing and curing according to the present invention. Even if the curing takes place in the same pass as the printing, there is still an advantage due to the lower speed of the carriage 12.

Figure 2A:
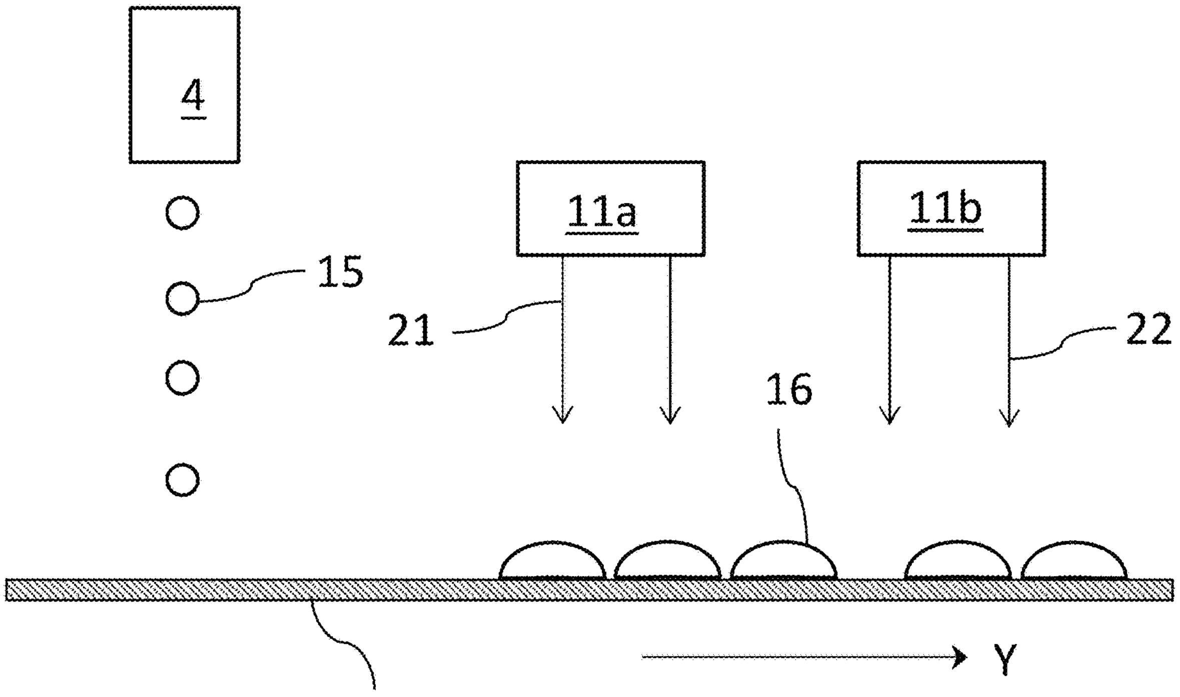
FIG. 2A schematically shows a first example of the method according to the present invention.

FIG. 2A schematically shows a first example of the method according to the present invention. A print head 4 is provided configured to jet droplets 15 of ink onto a receiving medium 2. Only one print head 4 is depicted in FIG. 2, but in practice, a plurality of print heads may be provided, optionally jetting different colors of ink. Each one of the droplets 15, when jetted by the print head, is in the fluid state. The receiving medium 2 onto which droplets 15 of the ink are applied is moved in direction Y, which is the paper transport direction. In case a scanning ink jet process is used, for example the one shown in FIG. 1, the paper transport direction is often referred to as sub-scanning direction. After the droplets of ink have been applied the droplets may continue to cool down and a phase change may occur, which results in the formation of immobilized droplets 16. The immobilized droplets 16 are transported together with the receiving medium in the paper transport direction Y. Thereby, the immobilized droplets 16 are moved underneath the first source of UV radiation 11*a*. In this embodiment the UV curing device according to the present invention comprises two sources 11*a*, 11*b* of UV radiation The first source of UV radiation 11*a* emits a first beam of radiation, schematically depicted as rays of radiation 21. The radiation emitted by the first source 11*a* may have a first intensity. The immobilized droplets are pre-cured by the rays 21 of the radiation emitted by the first source of radiation 11*a*. The intensity of the radiation is selected such that the temperature of the droplets 16 does not exceed a predetermined temperature. Therefore, the droplets stay in the immobilized state. By pre-curing the droplets, the immobilized droplets 16 are partially cured and may thereby become even more immobilized. After undergoing the post-curing, there may be a certain time interval before the droplets are post-cured. Since the droplets 16 are immobilised, this should not negatively influence the quality of the image formed.

After the immobilized droplets 16 have been pre-cured, the droplets are moved underneath a second source of UV radiation 11*b*. This second source of UV radiation 11*b* emits a second beam of radiation, schematically depicted as rays of radiation 22. The radiation emitted by the second source 11*b* may have a second intensity. The immobilized droplets are post-cured by the rays 22 of the radiation emitted by the second source of radiation 11*b*. Upon post-curing the droplets 16, the droplets may be fixed onto the receiving medium and may not change shape any more, even if they are heated to a temperature above the predetermined temperature.

The type of the first source of UV radiation 11*a* and the second source of UV radiation 11*b* may be suitably selected.

Figure 2B:
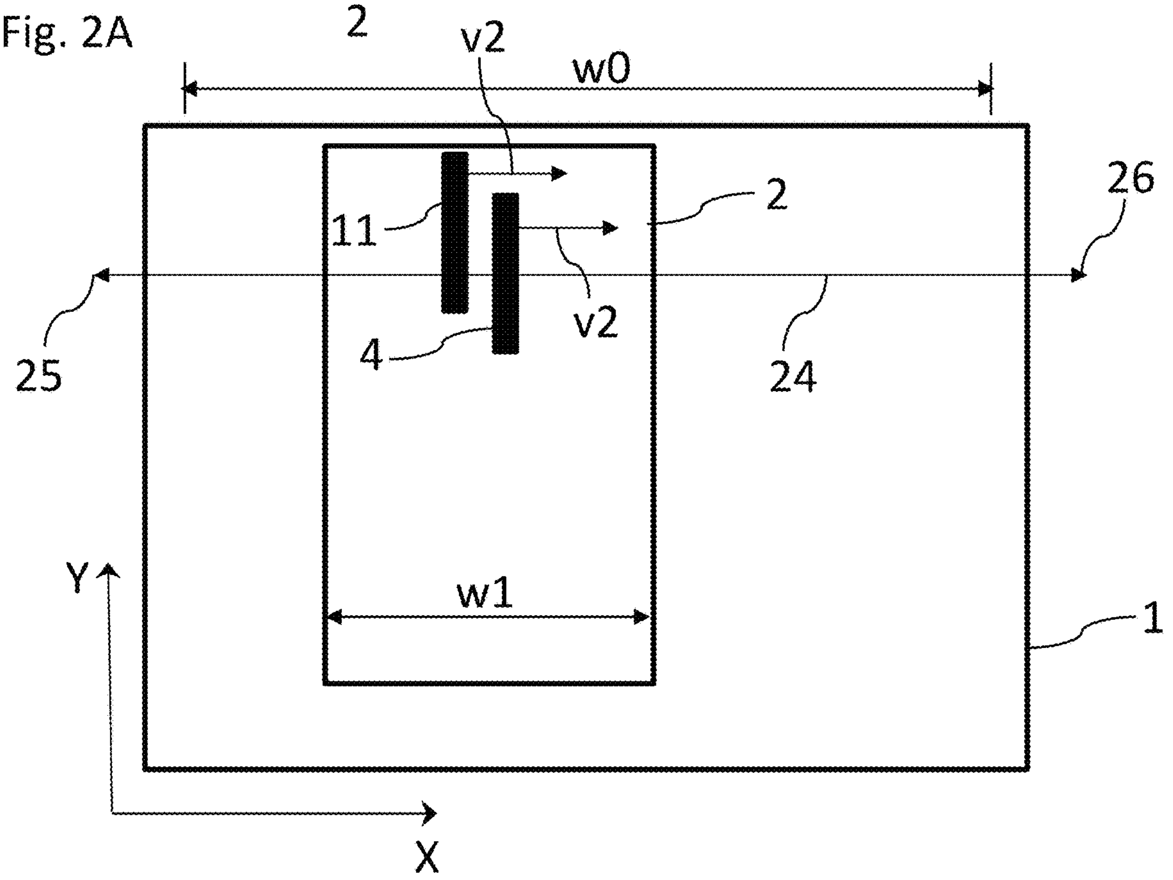
FIG. 2B schematically shows a second example of the method according to the present invention.

FIG. 2B schematically shows a second example of the method according to the present invention from a different point of view. An image receiving medium 2 is provided on the plate 1 and has a medium width w0 in the main scanning direction X which is much smaller than the maximum media width w1 in the main scanning direction X which can be handled by the digital inkjet printer 3. The print heads 4 and the curing device 11 are shown together with their trajectory 24. The trajectory 24 comprises passes from a left side turning point 25 towards a right side turning point 26 and vice versa In the turning points 25,26 the direction of both the print heads 4 and the curing device 11 is inverted. The image receiving medium 2 is moved in the sub-scanning direction underneath the print heads 4 and the curing device 11 in such a way that a swath produced in a pass of the print heads 4 in the main direction X is at least partially overlapping with a swath produced in a next or the same pass in the main scanning direction X in an opposite direction. According to the present invention the print heads 4 and the curing device 11 have a same second speed v2 which is lower than the first speed which is as a default speed applied by the digital inkjet printer 3 shown in FIG. 1A. The print heads 4 and the curing device 11 are displaced with regard to each other in the sub-scanning direction Y. Due to said displacement the curing step on a particular area of the image receiving medium 2 is in a later pass in the main scanning direction X than the printing step on the same particular area, since the swaths made in subsequent passes in the main scanning direction X are overlapping. Usually a pass width in the main scanning direction X is equal to the image width w0 in the main scanning direction X. According to an embodiment of the present invention, the pass width is enlarged up to a maximum medium width w1 in the main scanning direction X. In the turning points 25, 26 of the trajectory 24 of the print heads 4 and the curing device 11 the speed of the print heads 4 and the curing device 11 may be further lowered to extend the time between printing and curing even more. According to an embodiment of the present invention the print heads 4 and the curing device 11 are temporarily stopped in the turning points 25, 26 at the end of a pass in order to extend the time between printing and curing.

Figure 3:
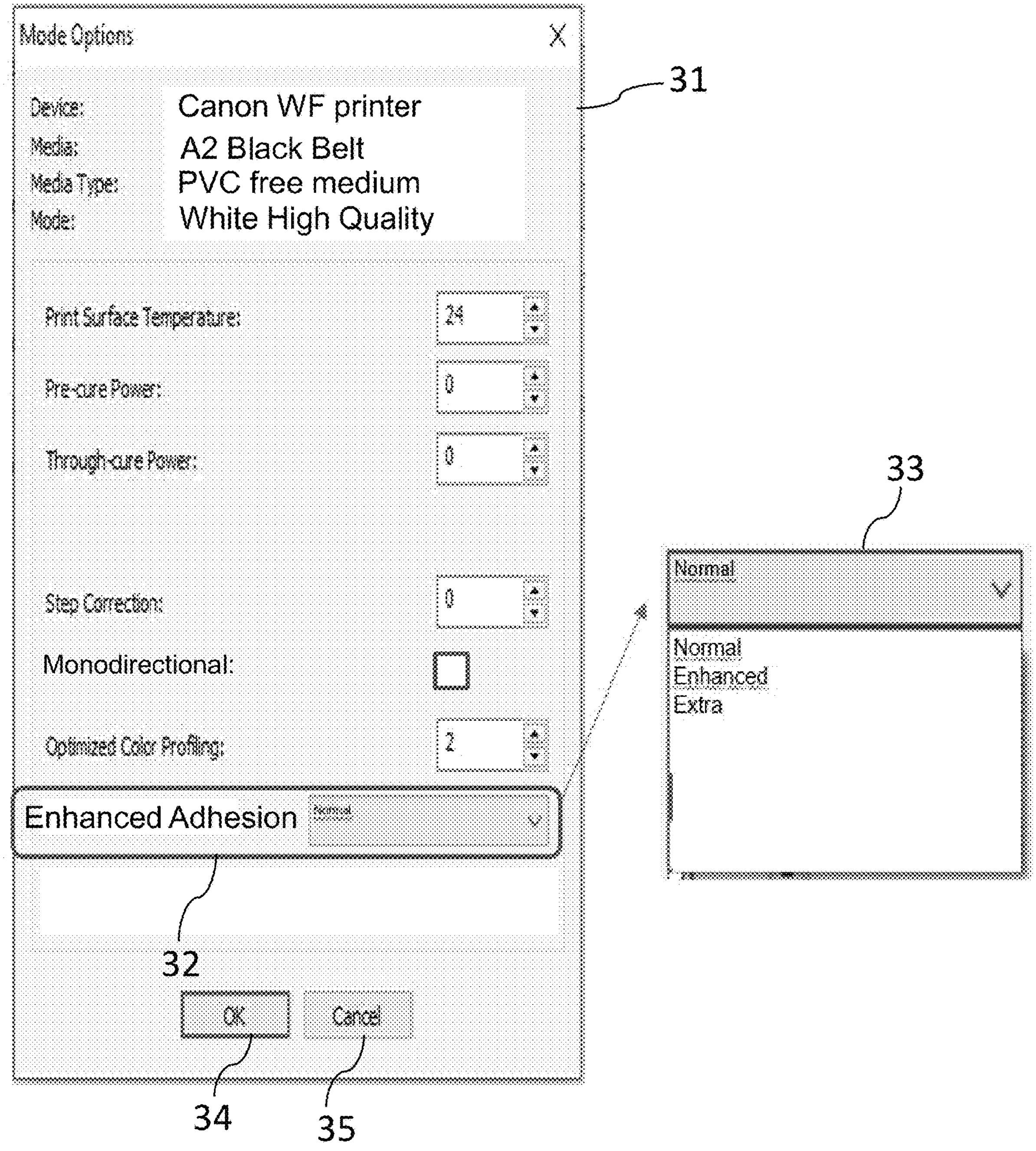
FIG. 3 schematically shows a user interface screen according to the present invention.

FIG. 3 shows a user interface screen 31 of the digital inkjet printer 3 for entering an enhanced print mode. A print surface temperature may be entered to regulate the temperature of the temperature control region 2*a* shown in FIG. 1A. A pre-cure power of the curing device 11*a* shown in FIG. 2A may be entered. A post-cure power of the curing device 11*b* shown in FIG. 2A may be entered. A step correction for a step in the sub-scanning direction Y may be entered. According to the invention, in order to further enlarge the time period between printing and curing a print mode of monodirectional printing may be selected by means of a check box. An optimized color profiling degree may be entered. According to the invention a print setting that the digital image is planned to be printed in an enhanced adhesion print mode is received via the user interface screen 31 in the drop down box 32. The possibilities of the drop down box 32 are shown in a separate window 33 for convenience reasons. The possibilities are “Normal”, “Enhanced” and “Extra Enhanced”. The possibility “Enhanced” may for example correspond to a lowering of the speed to a speed v2 which is 35/50 of the original speed and the possibility “Extra enhanced” may for example correspond to a lowering of the speed to a speed v2 which is 15/50 of the original speed. The user interface screen 31 is provided with a confirmation button 34 and a cancellation button 35. When the confirmation button 34 is activated the settings are sent to the print controller 10. When the cancellation button 35 is activated the user interface screen 31 is closed.

Figure 4:
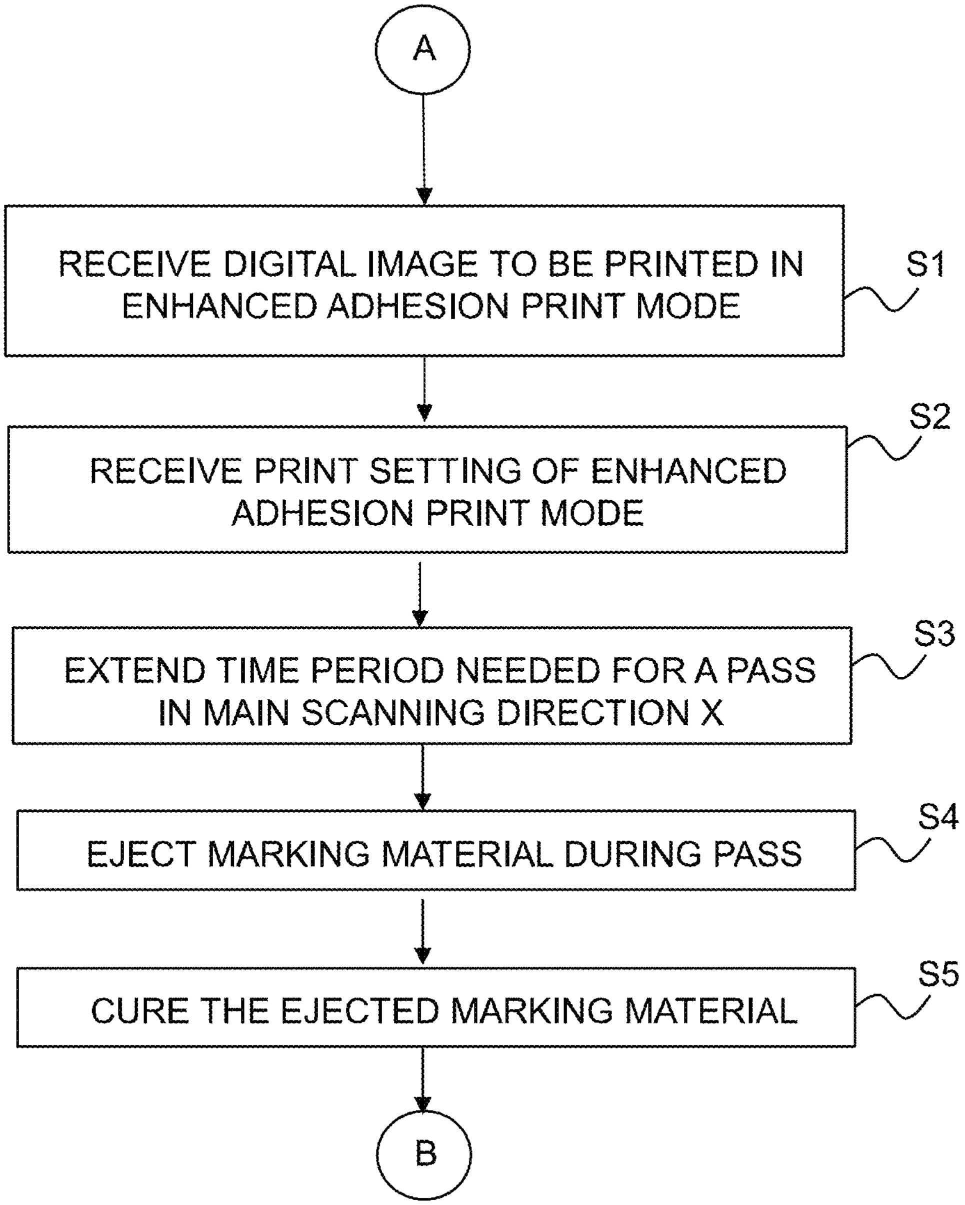
FIG. 4 is a flow diagram of the method according to the present invention.

FIG. 4 is a flow diagram of the method according to the present invention. The method starts in a start point A which leads to a first step S1.

In the first step S1 a digital image to be printed is received by the digital inkjet printer 3.

In a second step S2 a print setting is received that the digital image is planned to be printed in an enhanced adhesion print mode.

In a third step S3 a time period needed for a pass in the main scanning direction X is extended c1) by lowering a speed in the main scanning direction X from the first speed to a second speed, and c2) by enlarging the pass width up to a maximum medium width in the main scanning direction X and/or by temporarily stopping the at least one carriage 5,12 at an end of the pass.

In a fourth step S4 the marking material is ejected during the pass on the image receiving medium 2 by means of the print head 4*a*,4*b*,4*c*,4*d*,4*e* at the second speed within the extended time period.

In a fifth step S5 the marking material is cured by means of the UV curing device at the second speed within the extended time period.

The method ends in an end point B.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method of controlling a digital inkjet printer for printing images on an image receiving medium up to a maximum medium width, the digital inkjet printer comprising a print head with an array of printing elements for ejecting marking material on the image receiving medium and a UV curing device, the print head and the UV curing device being mounted on at least one carriage that is guided on guide rails, both the print head and the UV curing device being arranged to scan the image receiving medium in a main scanning direction, and the print head and the UV curing device being arranged to be moved relative to the image receiving medium in a sub-scanning direction normal to the main scanning direction in predetermined steps of relatively advancing the image receiving medium in the sub-scanning direction between passes of scanning the image receiving medium in the main scanning direction, the digital inkjet printer being arranged to operate in a selected first print mode having a first speed in the main scanning direction for the at least one carriage, the method comprising the steps of:

- a) receiving a digital image to be printed by the digital inkjet printer;
- b) receiving a print setting that the digital image is planned to be printed in an enhanced adhesion print mode;
- c) extending a time period needed for a pass in the main scanning direction:
  - c1) by lowering a speed in the main scanning direction from the first speed to a second speed; and
  - c2) by at least one of enlarging the pass width up to a maximum medium width in the main scanning direction and temporarily stopping the at least one carriage at an end of the pass,
- d) ejecting the marking material during the pass on the image receiving medium by the print head only at the second speed within the extended time period; and
- e) curing the marking material by the UV curing device only at the second speed within the extended time period.

2. The method according to claim 1, wherein the step of lowering the speed comprises the step of lowering the speed of the at least one carriage in the main scanning direction and simultaneously and accordingly lowering a frequency of ejecting the marking material on the image receiving medium.

3. The method according to claim 2, wherein the frequency of the second speed is 15/50 or 35/50 of the frequency of the first speed.

4. The method according to claim 1, wherein the step of extending a time period needed for a pass in the main scanning direction comprises temporarily stopping the at least one carriage at an end of the pass.

5. The method according to claim 1, wherein the step of extending the time needed for the pass comprises the sub-step of further lowering the speed of the at least one carriage when reverting the direction of the at least one carriage in the main scanning direction at the end of the pass.

6. The method according to claim 1, wherein the digital image as well as the print setting are received from an external raster image processor.

7. The method according to claim 1, wherein the digital inkjet printer comprises a user interface and the print setting is received by the user interface.

8. The method according to claim 1, wherein the method comprises the step of automatically setting the enhanced adhesion print mode depending on a kind of image receiving medium the digital image is planned to be printed upon.

9. The method according to claim 1, wherein the step of extending a time period needed for a pass in the main scanning direction comprises the sub-step of printing the pass according to a monodirectional print mode.

10. A digital inkjet printer for printing images on an image receiving medium up to a maximum medium width, the digital inkjet printer comprising;

- a print controller;
- a print head with an array of printing elements for ejecting marking material on the image receiving medium; and
- a UV curing device,
- wherein the print head and the UV curing device are mounted on at least one carriage that is guided on guide rails,
- wherein both the print head and the UV curing device are arranged to scan the image receiving medium in a main scanning direction, and
- wherein the print head and the UV curing device are arranged to be moved relative to the image receiving medium in a sub-scanning direction normal to the main scanning direction in predetermined steps of relatively advancing the image receiving medium in the sub-scanning direction between passes of scanning the image receiving medium in the main scanning direction,
- wherein the digital inkjet printer is arranged to operate in a selected first print mode having a first speed in the main scanning direction for the at least one carriage,
- wherein the print controller is configured to receiving a digital image to be printed by the digital inkjet printer, to receive a print setting that the digital image is planned to be printed in an enhanced adhesion print mode, and to extend a time period needed for a pass in the main scanning direction:
  - by lowering a speed in the main scanning direction from the first speed to a second speed; and
  - by at least one of enlarging a pass width up to a maximum medium width in the main scanning direction and temporarily stopping the at least one carriage at an end of the pass,
  - wherein the print head is configured to eject the marking material during the pass on the image receiving medium by the print head only at the second speed within the extended time period, and
  - wherein the UV curing device is configured to cure the marking material by the UV curing device only at the second speed within the extended time period.

11. The digital inkjet printer according to claim 10, wherein the digital image and the print setting are received by the print controller from an external raster image processor.

12. The digital inkjet printer according to claim 10, wherein the digital inkjet printer comprises a user interface and the print setting is received by the user interface.

13. A software product comprising program code on a non-transitory machine-readable medium, the program code, when loaded into a print controller of a digital inkjet printer, causing the print controller to control the digital inkjet printer in accordance with the method as claimed in claim 1.

14. The method according to claim 1, wherein the step of extending a time period needed for a pass in the main scanning direction comprises enlarging the pass width up to a maximum medium width in the main scanning direction.

15. The method according to claim 4, wherein the step of temporarily stopping the at least one carriage is executed when reverting the direction of the at least one carriage in the main scanning direction at the end of the pass.

16. The digital inkjet printer according to claim 10, wherein print controller is configured to extend a time period needed for a pass in the main scanning direction by enlarging the pass width up to a maximum medium width in the main scanning direction.

17. The digital inkjet printer according to claim 10, wherein print controller is configured to extend a time period needed for a pass in the main scanning direction by temporarily stopping the at least one carriage at an end of the pass.

* * * * *